(12) United States Patent
Malik et al.

(10) Patent No.: US 11,326,445 B2
(45) Date of Patent: May 10, 2022

(54) DEVICES AND METHODS FOR IMAGING WELLS USING PHASED ARRAY ULTRASOUND

(71) Applicant: DarkVision Technologies Inc., North Vancouver (CA)

(72) Inventors: Osman S. Malik, Vancouver (CA); Graham T. Manders, Vancouver (CA); Stephen E. Robinson, North Vancouver (CA)

(73) Assignee: DarkVision Technologies Inc., North Vancouver (CA)

( * ) Notice: Subject to any disclaimer, the term of this patent is extended or adjusted under 35 U.S.C. 154(b) by 0 days.

(21) Appl. No.: 17/026,984

(22) Filed: Sep. 21, 2020

(65) Prior Publication Data

US 2021/0003001 A1 Jan. 7, 2021

Related U.S. Application Data

(63) Continuation of application No. 15/765,106, filed as application No. PCT/CA2016/051167 on Oct. 6, 2016, now Pat. No. 10,781,690.

(Continued)

(51) Int. Cl.
*E21B 47/16* (2006.01)
*E21B 47/002* (2012.01)
(Continued)

(52) U.S. Cl.
CPC ............ *E21B 47/16* (2013.01); *B06B 1/0633* (2013.01); *E21B 47/002* (2020.05); *E21B 47/09* (2013.01);
(Continued)

(58) Field of Classification Search
CPC combination set(s) only.
See application file for complete search history.

(56) References Cited

U.S. PATENT DOCUMENTS 5,502,686 A 3/1996 Dory
5,640,371 A 6/1997 Schmidt
(Continued)

FOREIGN PATENT DOCUMENTS

CN 200985790 Y 12/2007
CN 101363314 A 2/2009
(Continued)

OTHER PUBLICATIONS

Jaksch et al.; Seismic Preditction While Drilling (SPWD): Looking Ahead of the Drill Bit by Application of Phase Array Technology; Sep. 7, 2010; No. 9; see Office Action (Year: 2010).*

(Continued)

*Primary Examiner* — Nabil H Syed
*Assistant Examiner* — Cal J Eustaquio

(57) ABSTRACT

Methods and devices for imaging wells using phased array ultrasound imaging devices is described. The devices enable high resolution real-time imaging of a well during various operations in the well, including during completions, fracturing, milling, fishing and drilling operations. The phased array ultrasound imaging devices may be integrated with other well tools, such as a bottom hole assembly (BHA), fishing tools, milling tools, fracturing tools, and drilling tools, in order to integrate imaging capabilities into such tools.

7 Claims, 11 Drawing Sheets

Related U.S. Application Data

(60) Provisional application No. 62/239,372, filed on Oct. 9, 2015.

(51) Int. Cl.
    *B06B 1/06*     (2006.01)
    *E21B 47/09*     (2012.01)
    *G01V 1/46*     (2006.01)
    *G01V 1/50*     (2006.01)
    *G01V 1/52*     (2006.01)

(52) U.S. Cl.
    CPC .................. *G01V 1/46* (2013.01); *G01V 1/50* (2013.01); *G01V 1/52* (2013.01)

(56) References Cited

U.S. PATENT DOCUMENTS

| | | |
|---|---|---|
| 5,899,958 A | 5/1999 | Dowell |
| 6,295,872 B1 | 10/2001 | Van |
| 6,483,777 B1 | 11/2002 | Zeroug |
| 7,051,812 B2 | 5/2006 | Mckee |
| 7,617,052 B2 | 11/2009 | Van |
| 8,294,758 B2 | 10/2012 | Lynde |
| 8,611,183 B2 | 12/2013 | Winkler |
| 9,670,770 B2 | 6/2017 | Mekic |
| 2007/0045265 A1* | 3/2007 | McKinzie, II .......... E21B 36/04 219/207 |
| 2007/0215345 A1 | 9/2007 | Martinez |
| 2009/0158850 A1 | 6/2009 | Alleyne |
| 2009/0213690 A1 | 8/2009 | Steinsiek |
| 2009/0288879 A1 | 11/2009 | Arena |
| 2009/0294124 A1* | 12/2009 | Patel ....................... E21B 23/02 166/255.2 |
| 2011/0087434 A1 | 4/2011 | Lie |
| 2012/0127830 A1 | 5/2012 | Desai |
| 2012/0176862 A1 | 7/2012 | D |
| 2013/0333879 A1 | 12/2013 | Rasheed |
| 2014/0050046 A1 | 2/2014 | Sinha |
| 2015/0198733 A1 | 7/2015 | Lie |
| 2016/0017702 A1* | 1/2016 | Koscheev ............... G01S 13/90 166/254.1 |
| 2016/0259079 A1* | 9/2016 | Wilson ..................... E21B 7/06 |

FOREIGN PATENT DOCUMENTS

| | | |
|---|---|---|
| CN | 202943014 U | 5/2013 |
| CN | 102128028 B | 6/2013 |
| CN | 102128029 B | 6/2013 |
| EP | 1348954 A1 | 10/2003 |
| GB | 2553714 A | 3/2018 |
| WO | 2013101694 A3 | 3/2014 |

OTHER PUBLICATIONS

Office Action received for UK Application No. GB1804802.5, dated Feb. 18, 2021, 2 Pages.
Office Action received for UK Application No. GB1804802.5, dated Dec. 22, 2020, 5 Pages.
Tymons, "Captured by Space 3D perspective on well performance", Archer The well Company, pp. 67, Apr. 5, 2011.
"The Space Series" Archer The well Company, pp. 5.
International Preliminary Report on Patentability for PCT application No. PCT/CA2016/051167, dated Apr. 10, 2018, 7 pages.
International Search Report and Written Opinion for PCT application No. PCT/CA2016/051167, dated Jan. 9, 2017, 10 pages.

\* cited by examiner

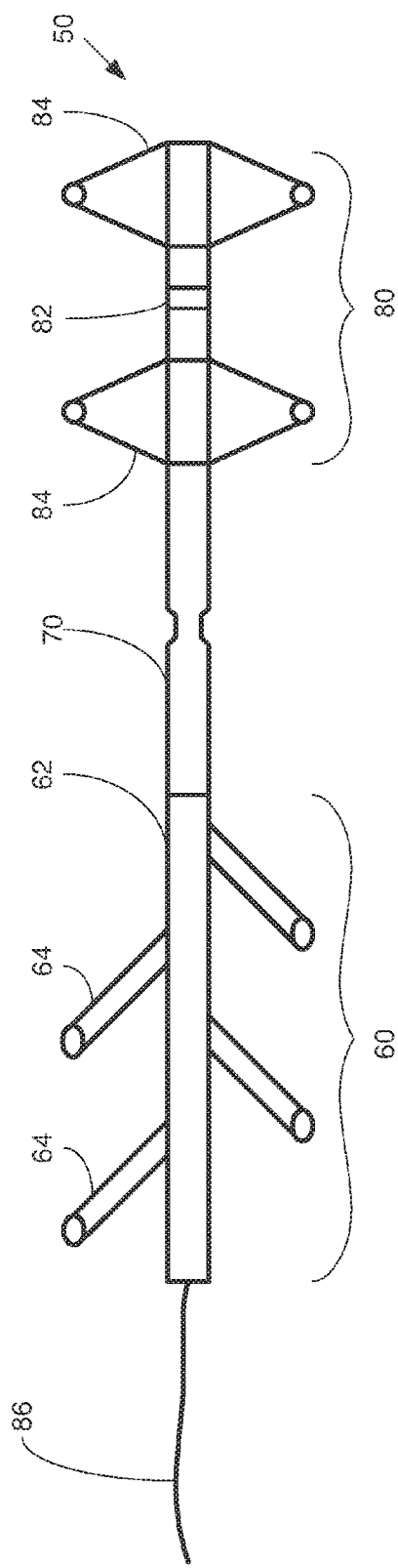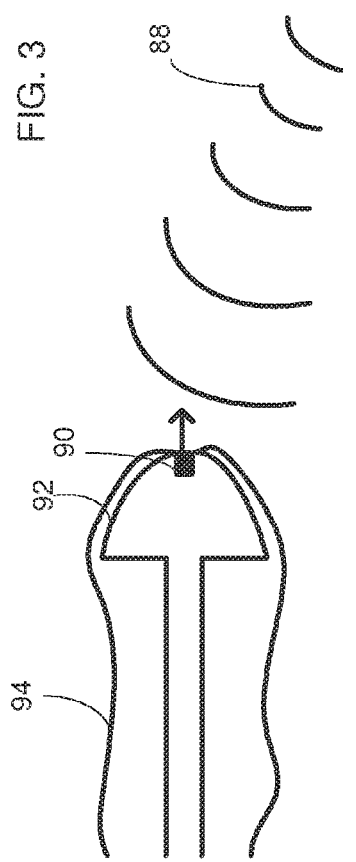
FIG. 3
FIG. 4

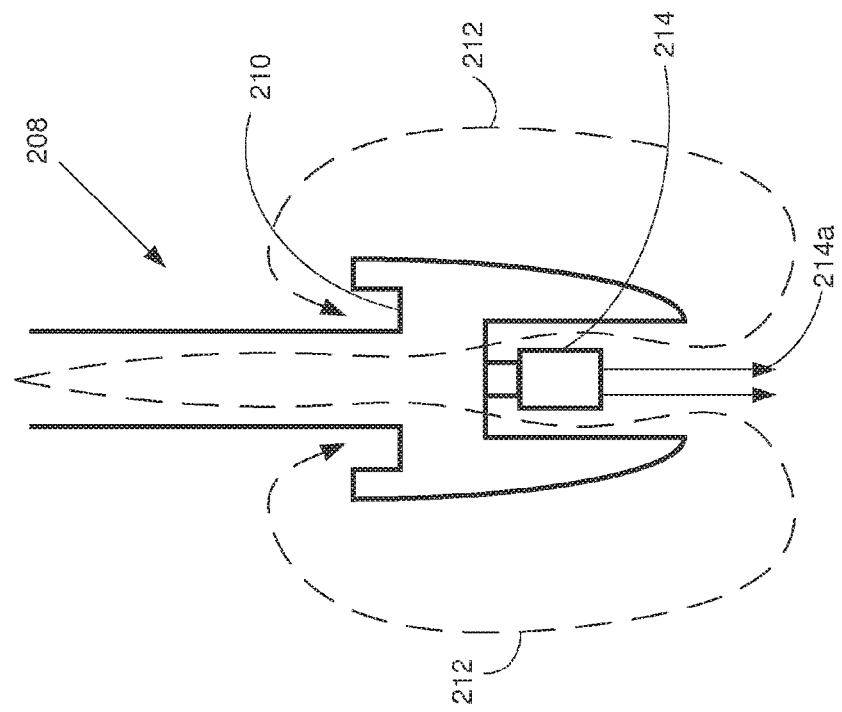
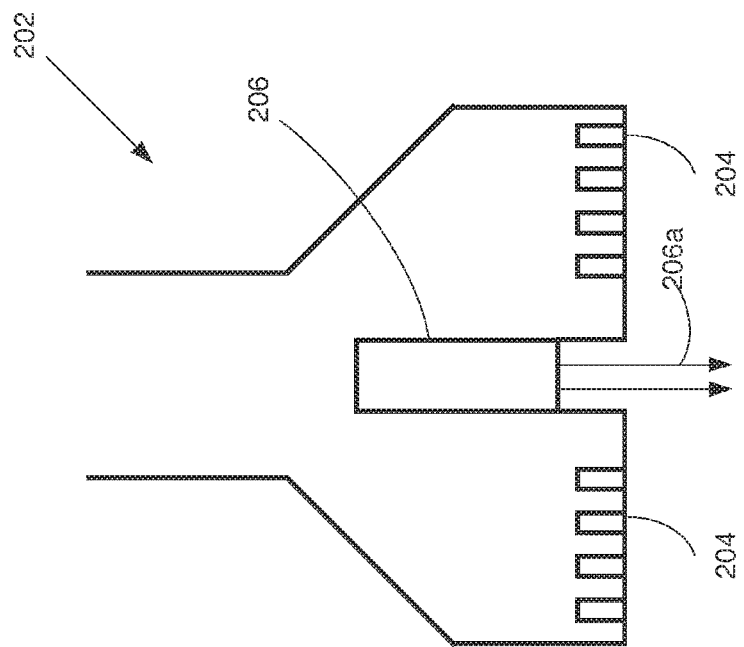

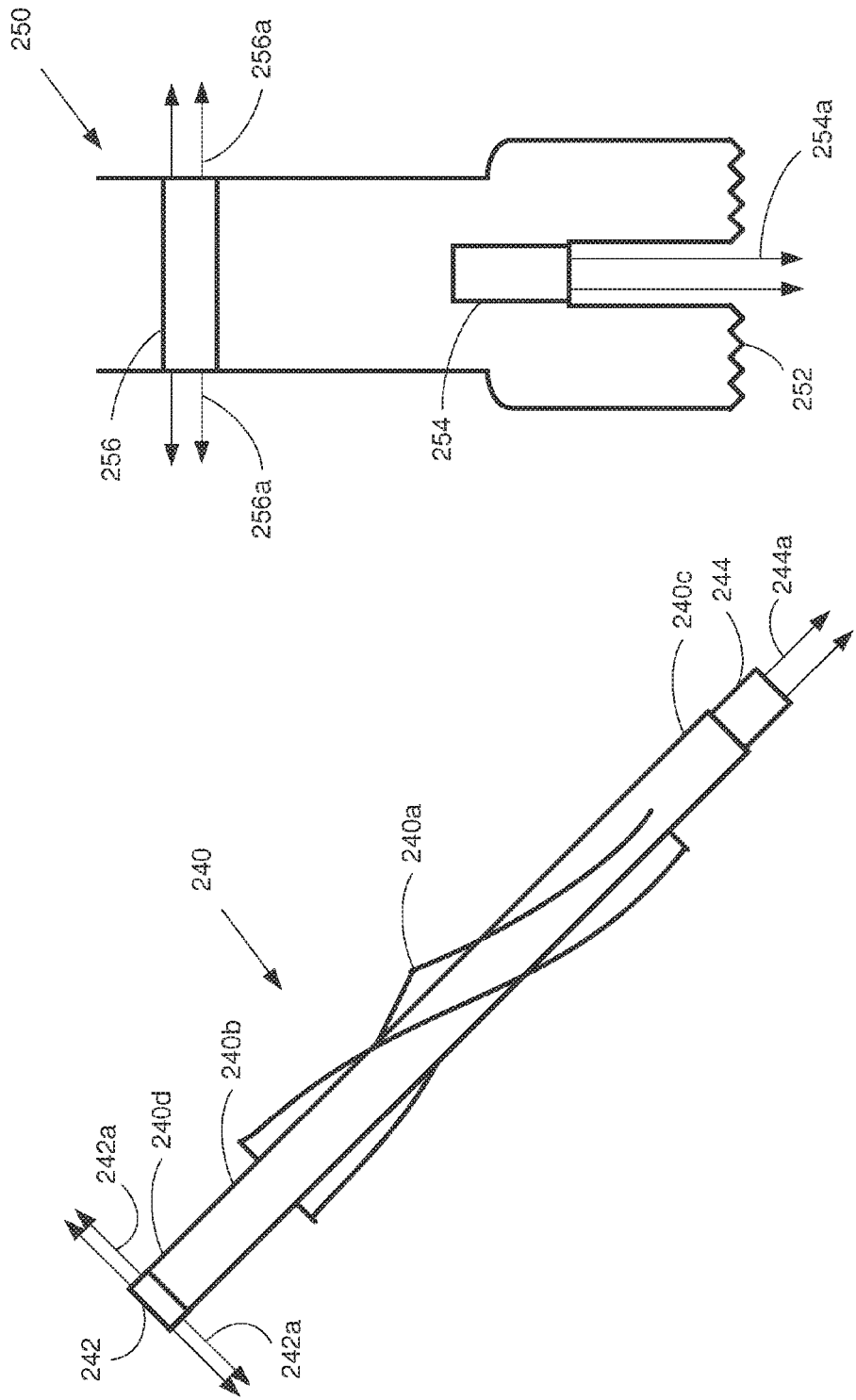

DEVICES AND METHODS FOR IMAGING WELLS USING PHASED ARRAY ULTRASOUND

CROSS-REFERENCE TO RELATED APPLICATIONS

This application is a Continuation of U.S. application. Ser. No. 15/765,106, filed Mar. 30, 2018, which is a National Phase Application pursuant to 35 U.S.C. § 371 of International Application No. PCT/CA2016/051167, filed Oct. 6, 2016, which claims priority to U.S. Provisional Application No. 62/239,372, filed Oct. 9, 2015, each of which is hereby incorporated by reference in its entirety.

FIELD OF THE INVENTION

The invention relates generally to well imaging, and more specifically to imaging oil and gas wells using phased array ultrasound.

BACKGROUND OF THE INVENTION

There is a general need to obtain information and data regarding the status and condition of an oil and gas well during various well operations, such as drilling, completion, production, maintenance and repair. The information can be valuable in making informed decisions regarding the well and futures wells, and in preventing and troubleshooting any problems. Information can be gathered through imaging devices which can help determine the condition of various assemblies and components in the well, either as a preventative measure or when there is a suspected integrity issue. Well imaging can also provide information on what components are in the well, and can capture information on any obstructions in the well. The data gathered from well imaging is valuable for maximizing performance, recovery and efficiency of a well, while minimizing environmental and safety risks.

Prior art methods of well imaging, such as cameras, calipers, lead impression blocks and ultrasonic imaging devices, all have limitations with regard to the quality of imaging data they can provide, and the speed at which they can obtain such data. For example, cameras have limited speed with which they can move through a well and capture imaging data. They are generally only practical when the location of an integrity issue or obstruction in a well is already known, and the camera simply needs to be deployed to that specific area to capture images. Cameras also only work when there is clear water or gas in a well, which is rarely the case during many phases in the life of a well. Additionally, cameras are limited to only being able to capture images of the surface of the well, and cannot penetrate through opaque fluids, steel, cement or other materials found in wells.

Calipers are also used in well imaging, but calipers are only able to provide low resolution measurements of the inside diameter of a well and cannot be used to obtain a detailed and intuitive image of a well. Lead impression blocks and other mechanical imaging means such as the fish-imaging system in U.S. Pat. No. 8,294,758 can be used to obtain imaging information on "fish" or obstructions in a well, but they can only give an impression of the surface of the obstruction and cannot provide detailed information on the orientation and size of the obstruction. The data these systems provide is of limited use when there are occlusions or obstructions with complex geometry.

Several oil and gas companies use an ultrasonic imaging device with a spinning head, for example the Ultrasonic Borehole Imager (UBI) of Schlumberger. These devices have limited speed at which they can operate, and generally only provide low resolution images at low frequencies. These spinning head tools are also required to be centralized in the well, which is challenging and often not possible in deviated wells The prior art teaches that ultrasound technology can be used for general downhole imaging and measurement operations. See for example, U.S. Patent Publication No. 2009/0213690; Chinese Patent Application No. 102128029; U.S. Patent Publication No. 2012/0176862; WO Publication No. 2013/101694; U.S. Pat. No. 8,611,183; U.S. Pat. No. 6,483,777; Chinese Patent Application No. 102128028; U.S. Pat. No. 7,617,052; U.S. Patent Publication No. 2012/0127830; U.S. Patent Publication No. 2014/0050046; and U.S. Pat. No. 6,295,872.

The prior art contemplates imaging devices having a phased array design, such as U.S. Pat. No. 5,640,371 owned by Western Atlas International, Inc., Chinese Patent Application No. 101363314 and Chinese Patent No. 200985790. Chinese Patent No. 202943014 describes a phase control round arc array sound wave radiation unit that may be used for acoustic logging. Archer The Well Company also teaches the use of phased array ultrasound technology for well operations (Archer The Well Company, The Space Series Brochure, R01/2011).

Importantly, prior art imaging methods, such as cameras, lead impression blocks, and ultrasonic imaging devices, require separate deployment into a well on a separate tool. This limits when imaging can occur during well operations, since imaging becomes a time-consuming and expensive process since other tools must be removed from a well before an imaging tool can be deployed. As such, it is difficult and expensive to provide imaging of a well before, during and after completion operations and recovery operations, as described in more detail below.

In Situ Well Pairs

Current in situ processes for recovering heavy oil typically use series of horizontal well pairs stacked on top of each other, the upper well being used to inject heat and the lower well being used for production. FIG. 1 illustrates a typical in situ well pattern having three well pairs 12, 14, 16 in a bitumen deposit 10. Generally, the well pair is designed such that the horizontal section of the injection well 12a, 14a, 16a is directly above (e.g. 4 to 10 meters above) the horizontal section of the production well 12b, 14b, 16b in each well pair. Later in field life, additional "in-fill" wells 18 may be drilled, and are typically located below the production well and slightly offset.

Referring to FIG. 2, each individual well, regardless of whether it is an injection well 20, production well 30 or in-fill well, generally comprises:

- A vertical section 22, 32 having a succession of solid steel pipe sections (casing string) 22a, 32a held in place in the wellbore by cement 22b, 32b.
- A horizontal section 24, 34 having a succession of liner sections (liner string) 24a, 34a, which are inserted into the wellbore without cement. The liners are sections of steel pipe with perforations, slots, screens or other openings to accept the production fluids. This horizontal section is often referred to as the "completion" and can be anywhere from a few meters in length to over 1000 meters.

The individual sections of liners generally have a threaded collar at each end for connection to adjacent liners. The majority of the liner is patterned with features/openings which allow bitumen to flow from the reservoir to the inside of the liner in the case of production and in-fill wells, and for steam/solvents/gases to flow from the liner to the reservoir in the case of injection wells. The openings are very small to keep sand and other small particulates from entering the liner.

Currently there are four general types of liners used in in situ wells:

1) Slotted liners have a number of thin slots cut into them, the slots having widths as small as 0.012".
2) Wire wrapped liners have holes of various types and sizes in a steel pipe, with a wire wrapping on the outside of the pipe. There may be multiple layers of wire wrapping.
3) Shrouded liners are similar to wire wrapped liners except that a steel sheet which has had holes created in it, typically by punching, is wrapped around the pipe. There may be multiple layers of punched sheet steel.
4) Insert screen liners have circular wire mesh 'plugs' inserted into a steel pipe.

Liners are generally screwed together to form a "liner string" and inserted into the open horizontal wellbore to form the completion. Typically the lower production well is drilled and completed before the upper injection well is drilled. To ensure consistent spacing and stacking of the injection well with respect to the production well, a magnetic ranging system is often used. A ranging tractor having a ranging magnet is typically propelled through the lower production well at the same time the upper injection well is being drilled. A detector on the drill in the upper injection well determines the location of the drill with respect to the ranging tractor in the lower production well based on the magnetic field emitted from the ranging magnet. This combination of ranging magnet and detector enables the drilling operator to guide the injection well drill so as to ensure that the injection well and production well are properly aligned with one another in terms of direction, orientation and distance from one another. After both wells have been drilled and completed, the well pair is placed "on-production" by injecting steam/solvent/gases into the injection well.

There are several differences between in situ bitumen well pairs and traditional oil and gas wells and therefore several unique problems arise with in situ well pair completions. The features/openings in in situ well pair liners are much smaller than the features/openings in traditional wells and are therefore more susceptible to damage during the completion process. If these small features/openings are damaged, sand and other particulates can enter the well which reduces bitumen production and can compromise production/injectivity. Damage and subsequent sand ingress, no matter what type of liner is used, blocks production/injection from not only the damaged area, but all areas upstream for the injector and downstream for the producer. Damage during the completions process can include damage to the screwed connections (joints) between individual sections of liners; damage to the slots, holes or features of the liners; damage to the external features of the liners such as wire wrapping, shrouds and external facing parts of the slots, including partial or full removal of the wire wrapping, shrouds or plugs; and deformation of some or all the sections of the liner due to mechanical stress through compression, tension and torsion. Furthermore the small distance between well pairs (~5 m) means that small defects can quickly create steam channels which can seriously damage wells There is a need to determine the condition of liner strings in in situ well pairs after completion and prior to the well being placed on production. There is a need for systems and methods to determine the status and condition of liner strings in in situ well pairs after the liner string has been positioned in the wellbore in order to assess any damage and take appropriate measures before the well pair is placed on-production. Importantly, there are several differences in imaging liner strings as compared to imaging conventional wells due to the unique conditions of in situ well pairs, including the very fine features found in liner strings, and the orientation and placement of in situ well pairs. In addition, there has been a need for systems and methods that improve the efficiency by which liners are placed in a well in which the overall number of steps to drill and complete a well is reduced.

Perforated and Multi-Stage Hydraulically Fractured Wells

Completion operations during production refers to the operations performed after drilling to prepare an oil or gas well for production. Completion operations often involve running in a completion string, perforating the casing and/or liner, and stimulating the well, which may involve acidizing and/or hydraulic fracturing.

In horizontal wells, "plug-and-perf" fracturing operations are common for fracturing multiple locations in the wellbore. In plug-and-perf operations, a plug is pumped into the wellbore to the desired depth, typically near the toe of the well. The plug is activated to seal off a downhole section of the wellbore from an uphole section of the wellbore and perforations are created in the well casing, uphole of the plug, to allow fluid flow between the inside of the casing and the surrounding formation. Perforations can be created in a variety of ways, including using explosives and a perforating gun, using rupture discs that are ruptured through the application of fluid pressure downhole, or using acid or abrasives such as sand to open up perforations. After perforations have been created, fracturing fluid is pumped downhole to fracture the formation adjacent the perforations. The plug prevents the fracturing fluid from flowing into the wellbore section downhole from the plug. After fracturing, the plug is deactivated such that the fracturing stage for a particular zone of the well is complete. This process may then repeated in stages moving uphole towards the heel of the well until all fractures are complete in all of the zones of interest.

Instead of "plug-and-perf" operations, a well may be fractured using a coiled tubing or rig deployed system that is run into the well. In this system, the coiled tubing is typically set up to contain packers at various intervals that can be set in sequence to isolate a section of the wellbore. After a packer is set, perforations or openings can be created uphole of the packer, similar to plug-and-perf operations, to allow fracturing to be undertaken uphole of the packer. The packers can be set in sequence from a downhole end of the coiled tubing/rig to an uphole end to allow fracturing to proceed in stages. There are a number of systems that can be configured to a coiled tubing string for isolating zones, opening the coiled tubing, perforating any well casing and undertaking the fracturing operations.

After completion operations have finished, it is often desirable to determine the condition of the completion. Various imaging tools, such as a camera or calipers, allow for such a determination, however they are generally only deployed into the wellbore after all completion operations have taken place. In order to determine the condition of the completion in the middle of completion operations, the entire completion string generally needs to be pulled from the wellbore and a separate imaging tool run-in, after which the imaging tool needs to be removed and the completion string run back into the wellbore to finish completion operations. This is very time-consuming and costly, and thus is typically avoided during completion operations unless a major problem occurs. This is particularly true during fracturing operations, due to the cost associated with paying a fracturing crew to stand-by while the completion string is removed and the imaging tool run-in.

Accordingly, it is generally desirable to determine the condition of a completion during fracturing operations, and specifically to determine the status and condition of the fracturing ports and perforations. Ports/perforations may be damaged or eroded during fracturing, and intact ports/perforations are essential for effective fracturing operations. Therefore it is particularly valuable to determine the condition of the completion immediately after fracturing has occurred, since there is generally a rapid change in conditions after fracturing has ceased. As such, any time lag between the end of fracturing and the capture of imaging data generally decreases the value of the imaging data obtained. Current technology that requires the completions string to be removed and a separate imaging system to be run-in does not allow for imaging to occur immediately after fracturing.

Information captured immediately after each stage of fracturing and/or after all fracturing stages have finished has enormous value in designing and configuring future fracturing stages and operations. For fracturing operations using pumped perforation fracturing processes where the plug assembly can be removed after each fracturing stage, this information is especially valuable since further fracturing stages can be modified based on the imaging information gathered. For other types of fracturing operations, such as coil or rig deployed perforation/isolation strings, the information gathered after each fracturing stage and at the end of all the stages can be used for designing and configuring future fracturing operations.

Accordingly, there is a need for systems and methods for imaging a completion string that is quick, reliable, relatively inexpensive, and doesn't require the removal of the completions string and the deployment of a separate imaging tool. There is a further need for systems and methods that can capture imaging information from a completion immediately before and after each fracturing stage and before and after the entire fracturing operation.

Recovery Operations

Recovery operations are used to retrieve objects and equipment lost downhole in a well, to open up damaged casing, and/or to clear obstructions, items and debris from a wellbore. Recovery operations include fishing, milling, swaging, and more.

Fishing is a common recovery process used in oil and gas wells to retrieve objects and equipment lost downhole. Any equipment sent downhole can be a "fish", including drillpipe, casing, bottom hole assemblies (BHAs), parts of BHAs and wireline tools. Fishing is a relatively expensive process due to the cost of fishing equipment, personnel, lost production time and most significantly, the cost of a drill rig or service rig used in the operation. A significant part of the fishing operations is the characterization of the fish, i.e. what the fish is and how it is positioned in the well, including what the fish looks like from the uphole side.

Currently, there are three general ways to characterize a fish. The first way is to estimate what the fish is based on what equipment has been recovered and what is missing. This is generally the fastest method, however the most imprecise. The second way to characterize a fish is to use an impression block. An impression block is a malleable block, typically made of lead, that is sent downhole and pressed on the top of the fish to get an impression of the top of the fish. There are several limitations and disadvantages to using an impression block. For example, an impression block does not provide comprehensive information on the fish since it only gives an impression of the top few millimeters of the fish. An impression can also be damaged or altered as it is being removed from the well, and the malleability of the block is limited. In wells with higher temperatures, the impression block may be too soft to perform adequately. Additionally, as is the case in all current imaging tools generally used, the impression block requires a separate trip into the well with a separate tool for gathering the impression, thereby increasing the time and cost of the fishing operation.

A third way to characterize a fish is to deploy a camera downhole to provide a visual picture of the top of the fish. However there are a number of limitations to cameras. Importantly, a camera requires a clear fluid on top of the fish to obtain an image of the fish. This may require that opaque fluids are removed from the well, which can be very difficult to achieve and generally increases the cost of the fishing operation. Replacing fluids is particularly challenging where opaque drilling mud acts as pressure control, and displacing the drilling mud can pose a safety risk. Additionally, cameras require a separate trip into the well with a separate tool to obtain the images, thereby increasing the time and cost of the fishing operation.

After the nature of the fish has been determined, a number of different types of recovery equipment can be deployed depending on the nature of the fish. Commonly used tools include magnetic fishing tools, junk baskets, fishing spears, overshot tools, mills, and more. Casing swages may also be used in recovery operations where there is damaged casing in order to open up or clear the casing.

Milling Operations

Milling is a common process used in oil and gas wells to remove items, obstructions or debris from a wellbore which cannot be recovered through fishing. Milling is also used to create a hole in an existing piece of casing or completion for the purposes of "sidetracking" the well. Sidetracking is the process of creating an alternative path or branch for the well either because there is a requirement for more branches (a multilateral well) or the existing path of the well is damaged and a new path is required. The hole that is milled in the existing casing/completion is called the "window". It is generally valuable to obtain information on the milling process, such as the shape, location and orientation of the window, and any lips or features around the window that may affect subsequent drilling operations. It is also valuable to ascertain information on the debris, items or obstructions in the wellbore in order to make the best decision regarding the type of milling tool to use, and to confirm that a milling operation has been successful in removing debris, items or obstructions from the wellbore. It is also valuable to ascertain whether any damage has been created in the wellbore by the debris, items or obstructions or by the milling process.

Currently, information regarding milling operations can only be gathered through the use of a camera that is deployed into the wellbore on a separate tool from the milling tool. This requires that the milling tool be removed from a wellbore before a camera is deployed, thus requiring multiple trips into the wellbore to gather information before, during or after milling operations, increasing the time and costs involved. For example, if an operator wants to obtain comprehensive information about milling operations for removing an obstruction from a well, they may deploy a camera into a wellbore prior to milling to obtain crude images on the location, position, type and size of the obstruction in order to make decisions on the milling operations. The camera would then removed from the wellbore and a milling tool, for e.g. a taper mill or junk mill, would be deployed into the well to grind up the obstruction. The milling tool is then removed and the camera is redeployed to confirm that the obstruction has been cleared from the well, and to ascertain whether any damage has been done to the wellbore. If the obstruction has not been sufficiently cleared, the milling tool or another tool is deployed to finish the clearing, after which the camera is redeployed to confirm that the well is cleared and to ascertain any damage to the well. The multiple trips with the camera greatly increases the cost and time involved in milling operations, and thus is typically only done when a problem is encountered. In this case, milling operations would be conducted without first obtaining imaging data on the obstruction, which can decrease the chance of success of the milling operation since milling is conducted blindly without having information about the obstruction. Additionally, if imaging data is not gathered after milling, there may be damage to the wellbore that is not known, which may affect subsequent well operations and cause problems in the future.

Drilling Operations

During drilling, it is generally desirable to obtain information on the formation through which drilling is occurring, and the condition and structure of the borehole after it is drilled. Due to the generally low data rates to surface during drilling operations, simple formation evaluation tools can be used to relay data during drilling operations to the surface. These fall under two broad categories, MWD (measurement while drilling) which covers geospatial and speed data, and LWD (logging while drilling), which covers formation evaluation. Dual element acoustic tools for caliper measurements are common in LWD applications.

Summary

In summary, there is a general need for a downhole imaging system that can gather high resolution real time images of a wellbore during various well operations. The value of such information is further enhanced when this imaging information can be gathered as part of the existing drilling/completing/maintenance processes. Collecting this information as part of the process saves time and money by eliminating the need for a separate deployment process to collect downhole data. Furthermore, in the case of completions processes, there has been a need for a baseline image of the well to be obtained directly after the well has been completed, allowing future imaging scans to be compared to this baseline.

SUMMARY OF THE INVENTION

In an aspect of the invention, there is provided a method for imaging an in-situ heavy oil well production liner string before the well is placed on production, the well comprising a substantially horizontal section, the method comprising the steps of: a) inserting a phased array ultrasound imaging system into the well; and b) moving the imaging system through the liner string in the substantially horizontal section of the well while activating the imaging system to generate a three-dimensional image of the liner string; wherein the three-dimensional image of the liner string can be used to assess the condition of the liner string. Steps a) and b) may be undertaken during a well completions process and/or the well may contain brine or water based drilling mud during imaging. The phased array ultrasound imaging system may have a ring-shape or radial transducer. The imaging system may include a ranging system operatively connected to the imaging system, and steps a) and b) may occur during ranging operations as a second well is being drilled adjacent to the well, and/or after ranging operations have been completed and the imaging system and ranging system are being removed from the well.

In an aspect of the invention, there is provided a device for imaging an in-situ heavy oil well production liner string during completions operations comprising: a body adapted for movement through the liner string; a downhole tractor operatively connected to the body for providing motive power to move the device through the liner string; and a phased array ultrasound imaging system operatively connected to the body for generating a three-dimensional image of the liner string that can be used to assess the condition of the liner string. The phased array ultrasound imaging system may have a ring-shaped or radial transducer. The device may further comprise a ranging system operatively connected to the body for guiding a drill in a second well as the second well is being drilled. The ranging system may include a ranging magnet.

In an aspect of the invention, there is provided a method for imaging a wellbore liner during fracturing operations comprising the steps of: a) deploying an imaging/isolation device having a phased array ultrasound imaging system and an isolation device into a wellbore to a first location; b) activating the isolation device to seal a downhole section of the wellbore containing the imaging system from an uphole section; c) perforating the wellbore liner uphole of the isolation device and fracturing the formation adjacent the perforations; d) deactivating the isolation system and advancing the imaging/isolation device at least partially uphole while imaging the wellbore liner where the perforation and fracturing occurred; and e) repeating steps b) to d) until fracturing operations are complete; wherein imaging the wellbore liner provides information that can be used to assess the condition of the liner string after fracturing has occurred. In step c), the perforations in the wellbore liner may be imaged after perforation but before fracturing. In step d) the imaging/isolation device may be pulled to the well surface and step a) repeated. In step a), an image of the wellbore liner may be taken while the device is being deployed. The isolation device may be a plug or a packer element.

In an aspect of the invention, there is provided a device for imaging a wellbore liner during fracturing operations comprising: a phased array ultrasound imaging system for generating an image of the liner string before and/or after a fracturing stage has occurred to assess the condition of the liner string; an activatable isolation element operatively connected to the imaging system, wherein activating the isolation element seals a downhole section of the wellbore from an uphole section of the wellbore to enable fracturing operations to occur, and deactivating the isolation element unseals the downhole section from the uphole section; and a deployment system operatively connected to the isolation element and/or the imaging system for deploying and removing the device from the wellbore. The imaging system may be located downhole of the isolation element to prevent fracturing fluids and high pressures from contacting the imaging system during fracturing operations. The isolation element may be a packer element or a plug. The deployment system may be coiled tubing, wireline or a service rig. The device may further comprise a perforation system for perforating the wellbore liner uphole from the isolation element.

In an aspect of the invention, there is provided a method for imaging a wellbore during recovery, milling or drilling operations comprising the steps of: a) deploying a recovery, milling or drilling tool having at least one integrated phased array ultrasound imaging system into the wellbore; and b) moving the recovery, milling or drilling tool through the wellbore while activating the at least one imaging system to generate images of the area in the wellbore in which recovery, milling or drilling operations are occurring. The at least one imaging system may have a forward facing transducer array wherein the generated images are of the area downhole of the tool, and/or the at least one imaging system may have a radial or ring-shaped transducer array wherein the generated images are of the area radial to the tool. The recovery, milling or drilling operations may be fishing operations where the tool is a fishing tool. The at least one imaging system may be activated while a fish is being recovered to enable better placement of the fishing tool relative to the fish. Alternatively, the recovery, milling or drilling tool is a casing swage, allowing for the at least one imaging system to be activated while casing is being swaged to obtain an image of the casing during swaging operations. Alternatively, the tool is a milling tool, such as a taper mill or a junk mill. The tool may also be a bottom hole assembly (BHA) adapted for operative connection to a drill string for drilling operations.

In an aspect of the invention, there is provided a device for imaging a wellbore during recovery, milling or drilling operations comprising: a recovery, milling or drilling tool adapted for movement through the wellbore and for recovery, milling or drilling operations in the wellbore; and at least one phased array ultrasound imaging system operatively connected to the recovery, milling or drilling tool for generating images within the wellbore. The at least one phased array ultrasound imaging system may comprise a ring-shaped or radial transducer array for obtaining images of the wellbore as the device is moved through the wellbore, and/or a forward facing transducer array, which may be at a downhole end of the tool for obtaining images of the volume located downhole of the device. The tool may be a fishing tool or a casing swage. In the case of a fishing tool, it may be a magnetic fishing tool, a junk basket, a fishing spear, or an overshot fishing tool. The tool may also be a milling tool, such as a taper mill or junk mill, or a bottom hole assembly adapted for operative connection to a drill string.

BRIEF DESCRIPTION OF THE DRAWINGS

Various objects, features and advantages of the invention will be apparent from the following description of particular embodiments of the invention, as illustrated in the accompanying drawings. The drawings are not necessarily to scale, emphasis instead being placed upon illustrating the principles of various embodiments of the invention. Similar reference numerals indicate similar components.

FIG. 3 is a schematic side view of a downhole device having a tractor, a phased array radial ultrasound tool and a ranging magnet.

FIG. 4 is a schematic side view of the downhole device of FIG. 3 in operation, wherein the device is being propelled through a completed lower production well as an upper injection well is being drilled.

FIG. 9A is a schematic cross-sectional side view of a magnetic fishing tool containing a phased array ultrasound imaging device.

FIG. 9B is a schematic cross-sectional side view of a junk magnet fishing tool containing a phased array ultrasound imaging device.

FIG. 10A is a schematic side view of a taper mill containing two phased array ultrasound imaging devices.

FIG. 10B is a schematic cross-sectional side view of a junk mill containing a phased array ultrasound imaging device.

DETAILED DESCRIPTION OF THE INVENTION

Figure 1:
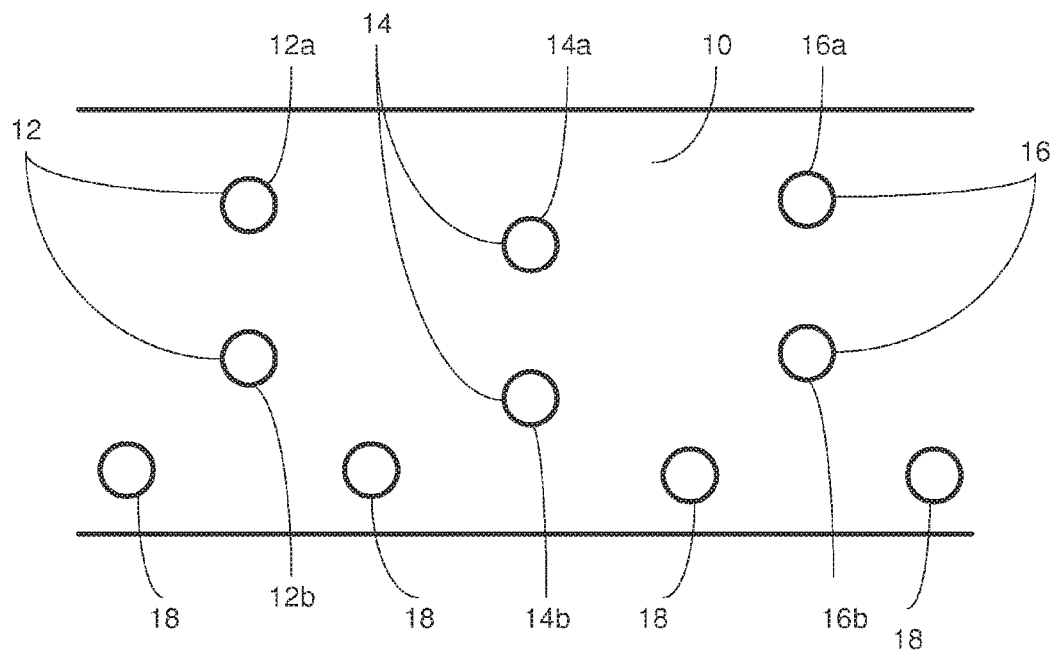
FIG. 1 is a schematic cross-sectional front view of a bitumen formation illustrating a typical prior art in situ well pattern, having three well pairs of upper injection wells and lower production wells, with additional in-fill wells.
Figure 2:
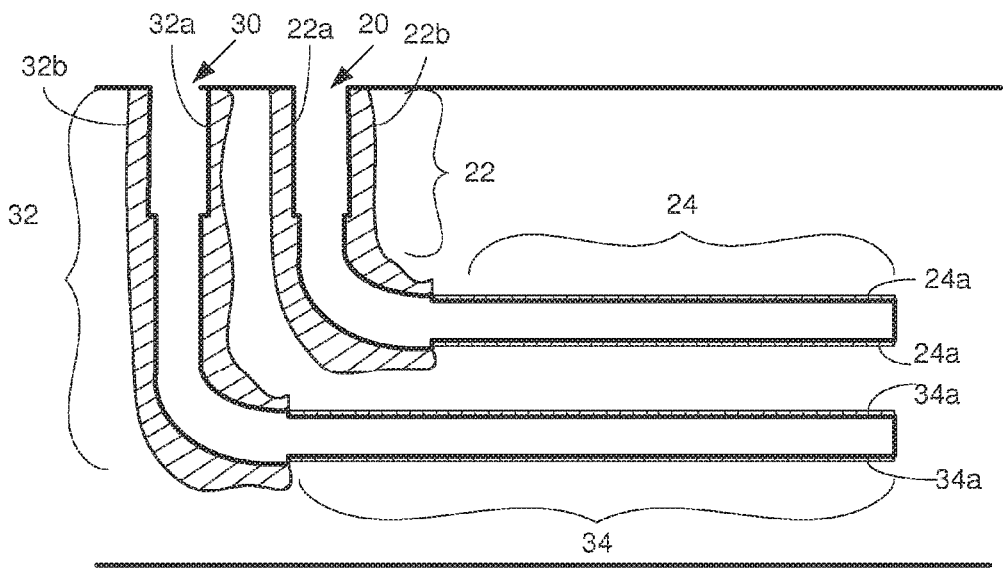
FIG. 2 is a schematic cross-sectional side view of an in situ well pair of the prior art having an upper injection well and a lower production well. Each well has a vertical section with casing cemented in the wellbore and a horizontal section having a liner string.

Various aspects of the invention will now be described with reference to the figures. For the purposes of illustration, components depicted in the figures are not necessarily drawn to scale. Instead, emphasis is placed on highlighting the various contributions of the components to the functionality of various aspects of the invention. A number of possible alternative features are introduced during the course of this description. It is to be understood that, according to the knowledge and judgment of persons skilled in the art, such alternative features may be substituted in various combinations to arrive at different embodiments of the present invention.

With reference to the figures, systems and methods for imaging hydrocarbon wells using phased array ultrasound technology are described. The systems and methods can be used during various well operations, including drilling, completion and production operations. The systems generally comprise one or more phased array ultrasound imaging devices that can be integrated with other tools depending on the specific operations that are being performed alongside the imaging. Integrating the phased array imaging device with other tools allows for imaging to occur during operations where it may traditionally be difficult to obtain imaging data, such as drilling, fracturing, fishing, milling, and more.

Phased Array Ultrasound Imaging Device

In accordance with the invention, a phased array ultrasound imaging device is used in the systems and methods for imaging wells.

Phased array ultrasound is an advanced method of ultrasonic testing that has several advantages over conventional non-phased array ultrasound technology. Conventional ultrasound technology uses a single-element (monolithic) probe that emits a beam in a fixed direction. To test or interrogate a large volume of material, the probe must be physically scanned/moved/turned/rotated to sweep the beam through the area of interest. In contrast, the beam from a phased array probe can be moved electronically without moving the probe, and can be swept through a wide 3-dimensional area at high speed. The beam is controllable because a phased array probe is made up of multiple small elements, each of which can be pulsed individually with computer-calculated timing. The term "phased" refers to the timing, and the term "array" refers to the multiple elements.

The phased array ultrasound imaging device of the invention generally includes one or more phased array ultrasonic transducer arrays and associated processing electronics. The transducer array converts electrical energy into sound to emit ultrasonic sound waves (i.e. above 18 kHz). Generally 0.5 to 10 MHz waves are used in the imaging system, however frequencies outside of this range may be used for certain applications. The transducer preferably comprises a plurality of individual piezoelectric (PZT) elements that transmit and receive ultrasonic pulses independently and can be timed in a sequence to set up a pattern of constructive interference resulting in a beam that can be steered electronically.

The imaging system may be battery powered or receive power from the surface, or both. The data from the imaging system may be conveyed uphole to the well surface through a transmission line or using wireless communication technology for immediate viewing. The data may also be stored onboard the imaging system for later retrieval in the event of a communication loss. The imaging system may record images continually or it may be triggered manually and/or automatically, such as through the use of movement triggers.

Specific Applications of the Phased Array Ultrasonic Imaging Device

Device for Imaging Liner String

In one embodiment, the phased array ultrasonic imaging device is used for imaging well liners. FIGS. 3 and 4 illustrates an imaging tool 50 incorporating the ultrasonic imaging device that can be used for imaging in situ well pair liners. The imaging tool generally comprises a conveyance system 60, an imaging system 70 and a ranging system 80.

In one embodiment, the conveyance system 60 comprises a downhole or well tractor having a body 62 and a plurality of wheel or drive sections 64 extending out of the body that abut against the inner wall 98 of the well casing or liner and are driven to push the well tractor through the well casing. At least one motor is situated in the body, and preferably each wheel or drive section has its own motor for independently driving each wheel. The conveyance system provides the motive power to drive the device 50 along horizontal sections of the wellbore, where gravity cannot be relied upon to move the device.

The imaging system 70 incorporates the phased array ultrasonic imaging device previously described, preferably using a ring-shaped or radial transducer array, which allows for a 3-dimensional image of the liner string to be produced with sufficient resolution to show the very fine details in the liner string, including the smallest slots which may be 0.012" wide.

The ranging system 80 comprises a ranging magnet 82 that emits a magnetic field 88 that can be detected by a detector 90 on a drill 92 to quantify the distance and direction of the detector from the magnet. Ranging systems are generally known to those skilled in the art for drilling wells to guide the drilling of a second well 94 with respect to a first well 96. Magnets are the most commonly used ranging tool, but others, including the use of radioactive sources and magnetized liners, may also be used.

The tool 50 may also comprise centralizing rods 84 that extend outwardly from the body of the tool and abut the inner wall 98 of the well casing or liner to keep the device in the center of the wellbore 100. Other means for keeping the device centralized in the wellbore could also be used.

In one embodiment, a cable 86 is operatively connected to the device to provide power to the conveyance system 60 and/or the imaging system 70 and to transmit information between the device and the well surface. The cable can also be used to tow the device through the liner string and/or the vertical section of the wellbore towards the well surface when recovering the device.

Method for Imaging Liner String

Figure 5:
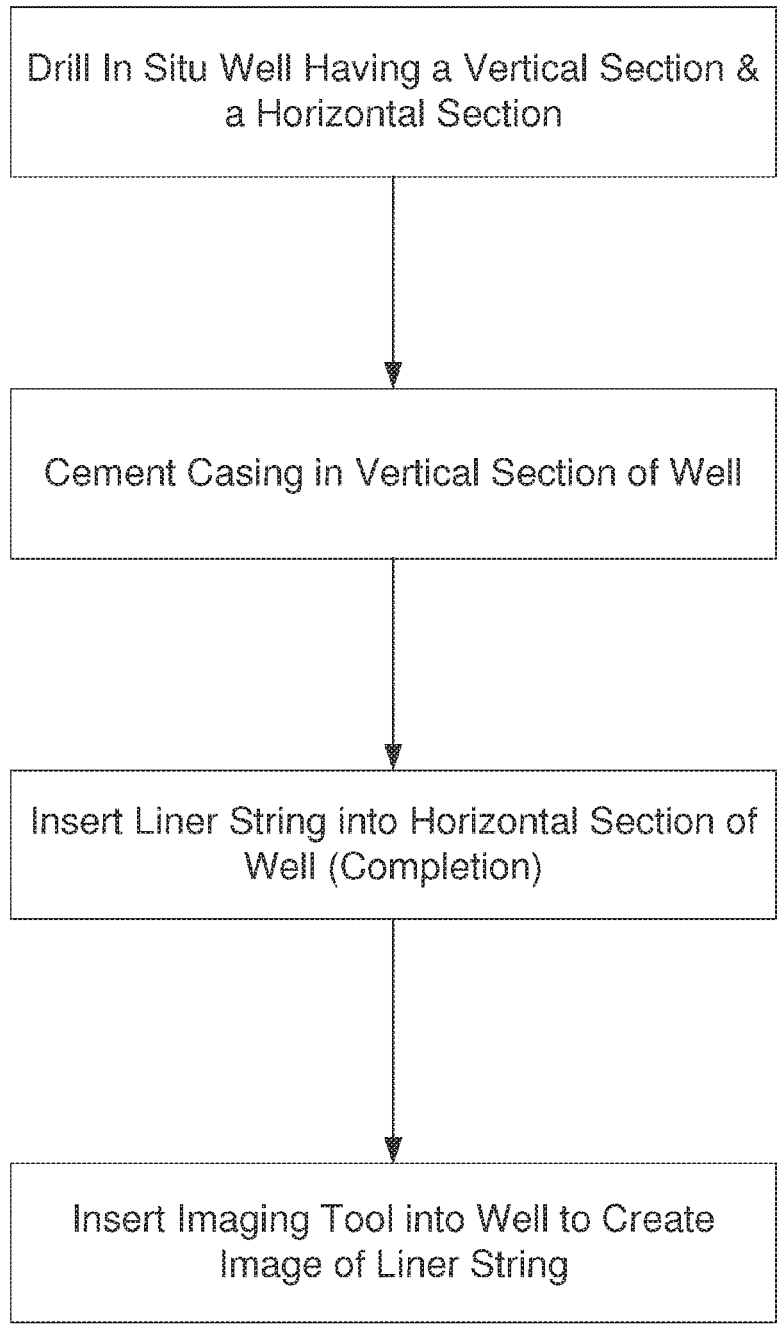
FIG. 5 is a flowchart illustrating a method for imaging a liner string in an in situ well.
Figure 6:
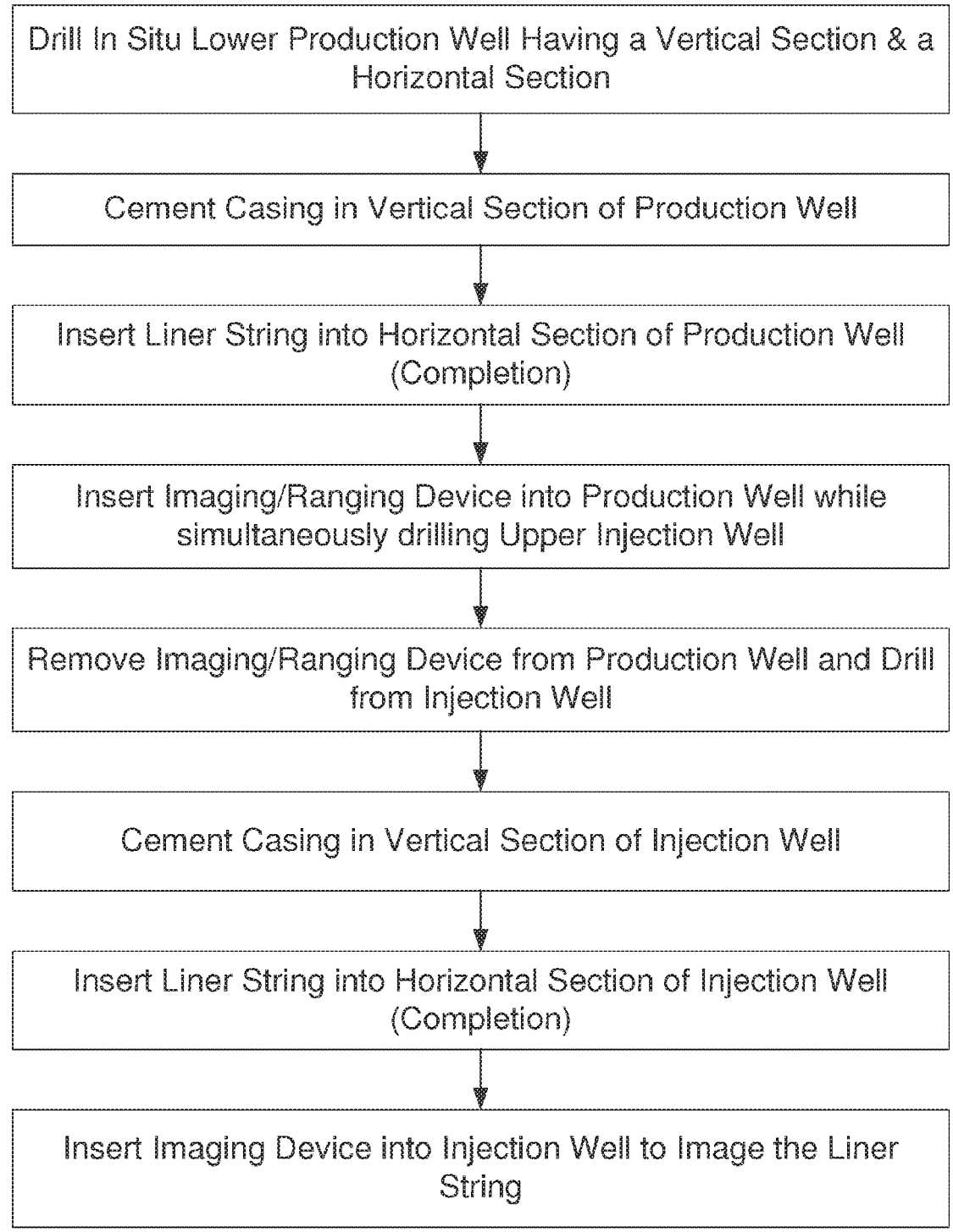
FIG. 6 is a flowchart illustrating a method for imaging a liner string of an in situ well pair using a device having imaging and ranging functions.

With reference to FIGS. 5 and 6, a method for imaging a liner string of an in situ well, such as a SAGD well, is described.

Initially, an in situ well having a vertical section and a horizontal section is drilled and casing is cemented into the vertical section of the well in accordance with known procedures. A liner string comprising a plurality of liners is inserted into the horizontal section of the well (i.e. the well is completed). Before the well is placed on production, imaging of the liner string takes place using the phased array ultrasound tool to create a 3D digital image of the entire liner string. The image is viewed to detect the condition of the liner string and/or if sand is present in the liner string to determine if remedial action needs to be taken prior to production.

In one embodiment, the imaging of the liner string occurs during the completion process when there are fluids present in the liner string and the well is generally at or close to ambient pressure and temperature. Typically, the fluids are brine or water based drilling muds. By imaging the liner string during the completions process instead of in a separate step, and by being able to provide clear images of sufficient resolution through the fluids that are present instead of having to remove the fluids, there are significant savings in terms of time and cost associated with imaging the liner string. The images provided by the phased array ultrasound tool of the liner can be used to identify defects in the liner string such as damage to slots, wire wrapping, or collar threading, mechanical damage and/or abrasion. They can also be used to identify if there is sand in the liner string.

In one embodiment, the imaging of the liner string is combined with ranging operations as outlined in FIG. 6. In this embodiment, an imaging device having both magnetic ranging capabilities and phased array ultrasound capabilities (such as the device illustrated in FIGS. 3 and 4 and described above) is propelled through a completed lower production well while an upper injection well is being drilled. The imaging of the production well liner can occur as the ranging operations are occurring and the imaging device is being driven downhole, or the imaging can occur as the imaging device is recovered back to the surface of the well. The imaging can also occur during both phases, i.e. during downhole and uphole movement of the imaging device. In this embodiment, after the upper injection well is completed, the imaging device is propelled through the injection well for imaging the injection well liner. Typically the ranging capabilities of the imaging device are not needed in the upper well since the lower well is already drilled, however the same device can be used. Alternatively, a different imaging device without ranging capabilities but with phased array ultrasound capabilities can be used to image the upper well liner.

In the embodiment shown in FIG. 6, combining ranging and imaging operations into one step results in significant savings in terms of time and money as separate completion steps are undertaken at the same time.

Device for Imaging Wells During Completion Operations

In another embodiment, the phased array ultrasound imaging device is integrated into a completions string for imaging a well during completion operations. The imaging device may be retrofit into an existing completions string, or a completions string designed to specifically incorporate the imaging device may be built. Incorporating the imaging system into a completions string advantageously allows for imaging of a wellbore liner to occur during completion operations without having to deploy a separate imaging system, and specifically allows for the imaging of fracturing ports and perforations immediately before and after fracturing.

Figure 7:
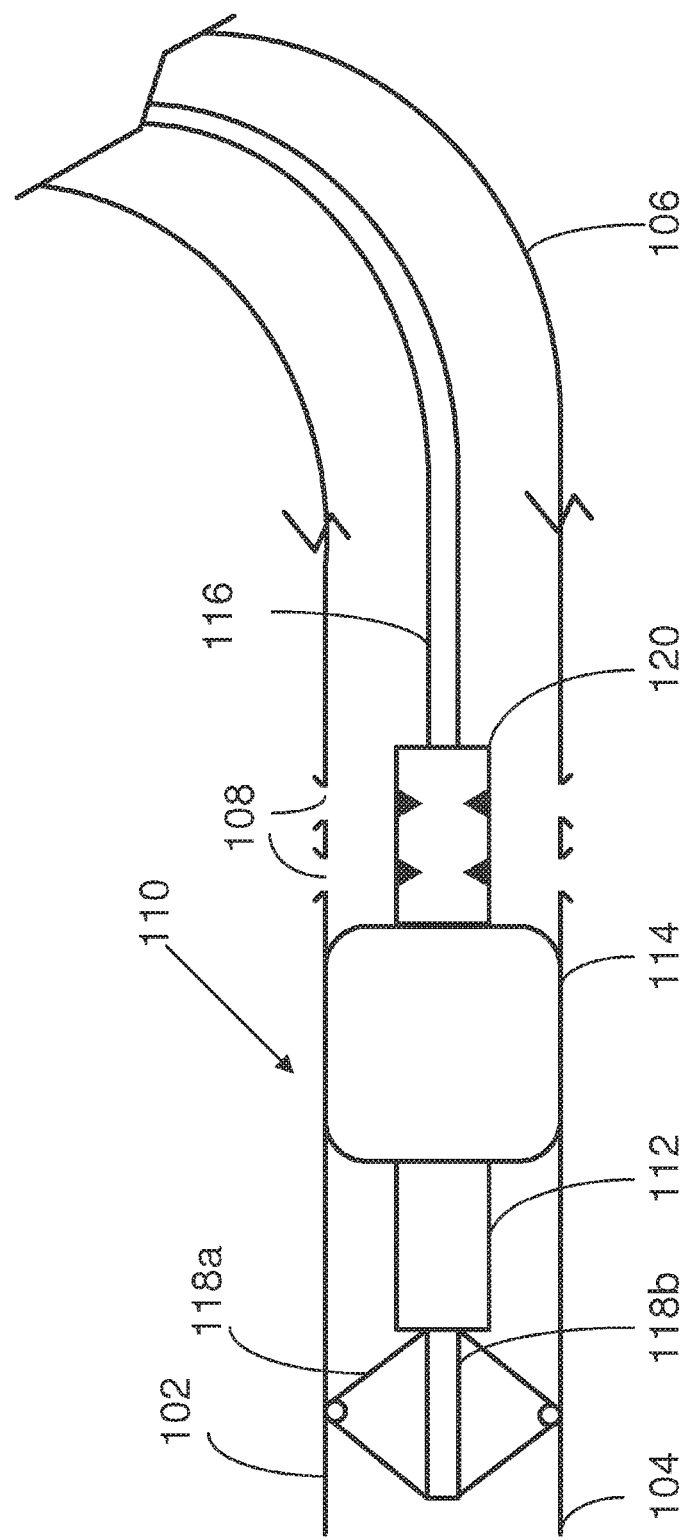
FIG. 7 is a schematic cross-sectional side view of an imaging and fracturing device positioned in a wellbore.

FIG. 7 illustrates one embodiment of the invention wherein a phased array ultrasonic imaging device 112 as previously described is integrated into a combined imaging and fracturing device 110. The phased array ultrasonic imaging device 112 preferably includes a ring shaped or radial transducer that can generate a 3D image of the wellbore liner, showing any changes to the perforations in the liner and any other features and defects in the liner.

As illustrated in FIG. 7, the imaging/fracturing device 110 is deployed in a wellbore liner 102 having a toe 104 at the downhole end of the wellbore and a heel 106 marking the transition between the wellbore's horizontal and vertical zones. Besides the imaging system 112, the imaging/fracturing device 110 includes, an isolation element 114 and a deployment system 116. The imaging/fracturing device may optionally include a centralizing element 118 and a perforating system 120.

Preferably, the imaging device 112 is operatively connected to the downstream side of the isolation element 114, which shields the imaging system from contact with high pressure and abrasive fracturing fluids located on the upstream side of the isolation during hydraulic fracturing operations, thereby prolonging the life and reliability of the imaging device.

When the imaging/fracturing device 110 is positioned in a liner string, the isolation element 114 can be activated or set to create a tight annular seal within a liner string to seal a downhole section of the liner string from an uphole section during fracturing operations. The isolation element can be one of several types of isolations that are used in fracturing operations, such as a plug or a packer element as known by those skilled in the art. For example, these may include expandable and resealable/resetable packers and plugs which can be expanded and contracted multiple times without loss of pressure isolation ability.

The deployment system 116 is operatively connected to the isolation element 114 and/or imaging device 112 to enable the imaging/fracturing device 110 to be run into and removed from the wellbore. Generally the deployment system is a wireline or coiled tubing that may be specifically adapted for these operations. Other deployment systems that are known to those skilled in the art can also be used, such as downhole tractors, service rigs, and pumped plug systems.

The centralizing element 118 is designed to keep the imaging/fracturing device 10 in the center of the wellbore. FIG. 7 illustrates one embodiment of a centralizing element, wherein the element includes centralizing rods 118a that extend from a body 118b and abut the inner wall of the well casing or liner to keep the imaging/fracturing device in the center of the wellbore.

Other means for keeping the device centralized in the wellbore can also be used, including the inherent stiffness of the completions string, especially if deployed on coiled tubing or a service rig. Alternatively, two centralizers can be used in conjunction with two knuckle joints in order to centralize the imaging system independently from the isolation element and deployment system. The two centralizers serve to centralize the imaging device while the knuckle joints allow for freedom of movement between the imaging system and other components.

The imaging/fracturing device 110 may optionally include a perforating system 120 positioned uphole of the isolation element 114 for creating perforations 108 in the liner and/or casing during fracturing operations. In one embodiment, the perforating system is a perforating gun containing charges/explosives. Examples of various perforating systems include high pressure sand, acid, burst discs and explosives.

Method for Imaging Wells During Fracturing Operations

Figure 8:
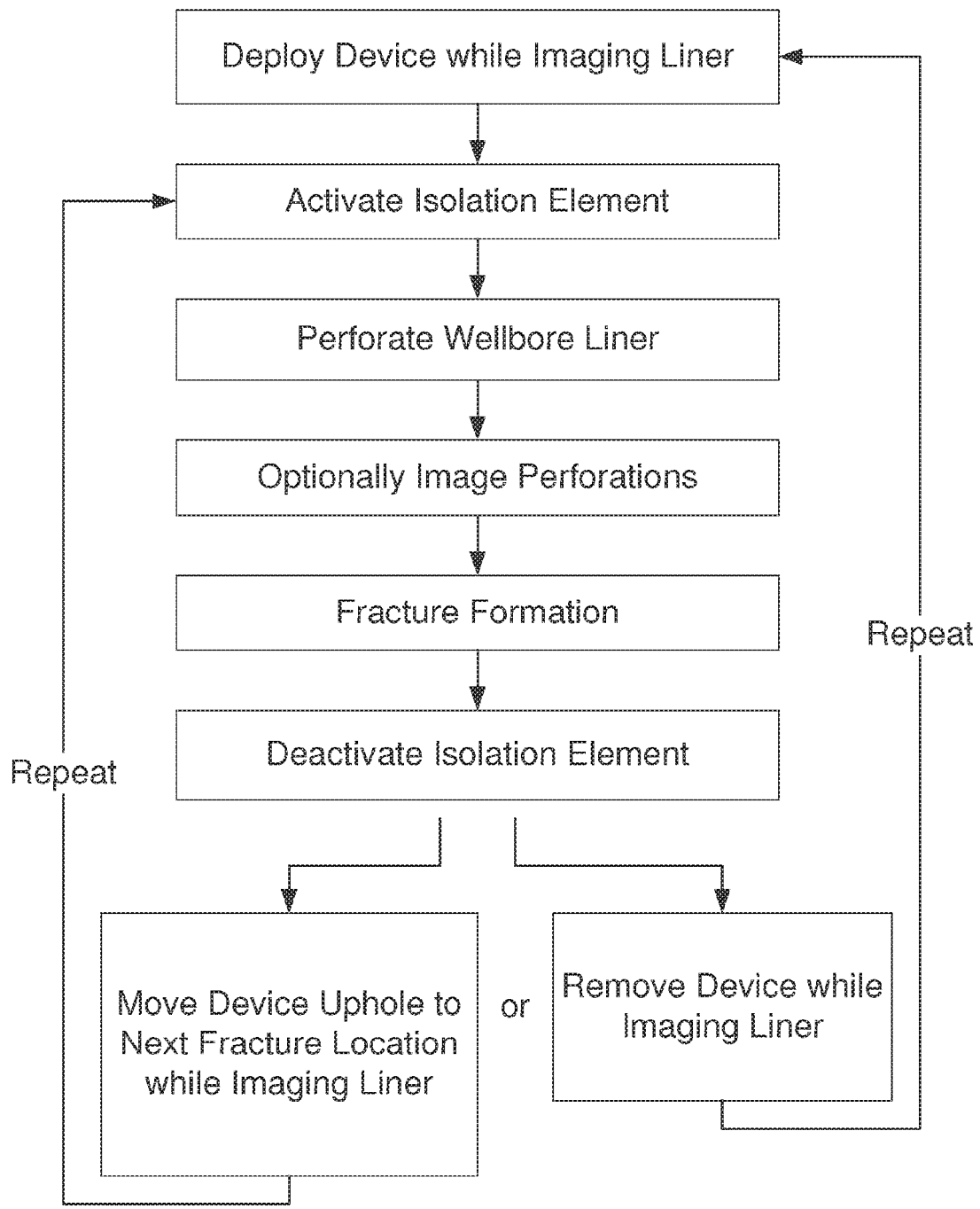
FIG. 8 is a flow-chart of a method for imaging and fracturing a hydrocarbon formation.

With reference to FIG. 8, a method for imaging a liner string during fracturing operations in a well is described.

After a well has been drilled and a casing and liner string have been run into the well, an imaging/fracturing device as described above and one embodiment of which is shown in FIG. 7 is run into the liner string to the desired location. While the device is being run in, the imaging system can capture an image of the liner/completion string to determine the condition of the string prior to perforating.

Next, the isolation element in the device is activated to seal a downhole section of the liner string from an uphole section. Perforations are created using known perforation techniques followed optionally by imaging of the perforations by unsetting the isolation element, moving the imaging system uphole to the perforations, then moving the imaging system back downhole and resetting the isolation element prior to hydraulic fracturing. Then fracturing operations commence by pumping hydraulic fracturing fluid downhole at high pressure to complete the first stage of fracturing. The isolation element prevents the fracturing fluid from entering the downhole section of the liner string, thus causing the fracturing fluid to exit the liner through the perforations, where it enters the surrounding formation to fracture the formation.

After the first stage of fracturing is complete, the isolation element is deactivated. At this point, depending on the fracturing system being used, the imaging/fracturing device, including the isolation element, is either moved uphole to the well surface, or moved uphole to the next fracture area or zone of interest. In a pumped plug system that uses a plug as the isolation element, the device is generally recovered to the well surface, whereas in a coil/rig deployed system that uses a packer as the isolation element, the device is generally moved uphole to the next fracture area.

After the first stage of fracturing is complete, the procedure is repeated for each subsequent fracture area or zone of interest. If the imaging/fracturing device was moved uphole only to the next fracture area, the procedure is repeated starting with setting the isolation element in the new location. If the imaging/fracturing device was moved to the well surface, it is deployed downhole again to the next fracture area, and an image may be captured by the imaging system as it moves downhole to provide information on the condition of the liner string right before the next fracturing stage.

The images and information generated by the imaging system can be used to identify the condition of the general mechanical installation of the liner string, such as identifying damage and leaks. It can also be used to identify the condition of the fracturing ports and perforations and their changes during the fracturing process, and specifically to identify if any damage or erosion has occurred during the fracturing process. Problems related to the completions integrity, including pinched liners caused be geological movements, damaged or loose collars, and sand intrusion can also be identified.

In one embodiment, the imaging of the liner string occurs right after fracturing is finished when there are fracturing fluids present in the liner string and the well is generally at or close to ambient pressure and temperature. The fracturing fluids may be water or hydrocarbon-based fracturing fluids, and may include various additives such as propants, gases, viscosifying agents, breakers, buffering agents, clay control agents, and more. Using a phased array ultrasound imaging system allows imaging to occur through opaque fluids.

By imaging the liner string during the completions process instead of in a separate step, and by being able to provide clear images of sufficient resolution through the fluids that are present instead of having to remove the fluids, there are significant savings in terms of time and cost associated with imaging the liner string.

Imaging Wells During Recovery Operations

In another embodiment, the phased array ultrasound imaging device is integrated with equipment used in recovery operations, such as fishing tools, milling tools and casing swages, to enable imaging during recovery operations.

FIGS. 9A, 9B, 9C, 9D and 9E illustrate various embodiments for integrating one or more phased array ultrasound imaging device on commonly used recovery tools. The imaging devices may include various shaped transducer arrays, such as forward facing transducer arrays for obtaining imaging data from the volume in front of the array, and/or radial transducer arrays for obtaining imaging data in the radial area around the transducer and fishing tool.

FIG. 9A illustrates a magnetic fishing tool 202 comprising a plurality of magnets 204 and an integrated phased array ultrasound imaging device 206 having a forward facing transducer array for imaging an area in front of the imaging device shown by arrows 206a.

FIG. 9B illustrates a junk basket fishing tool 208 that drives small items around the outside of the tool and into a basket 210 on the tool, shown by the arrows 212. A phased array ultrasound imaging device 214 having a forward facing transducer is integrated into the tool to provide imaging data on the "junk" or items located in the well in front of the tool, shown by arrows 214a.

Figure 9E:
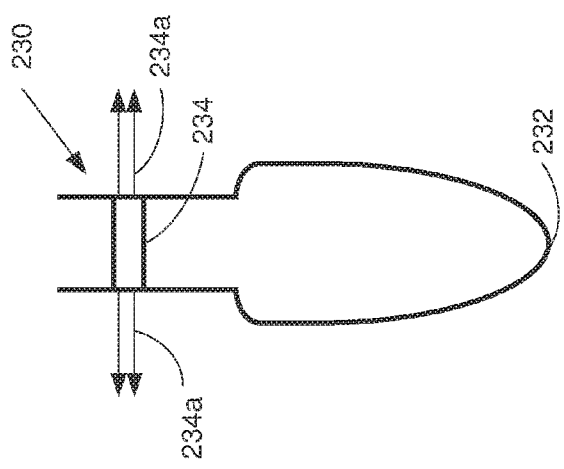
FIG. 9E is a schematic side view of a casing swage containing a phased array ultrasound imaging device.
Figure 9D:
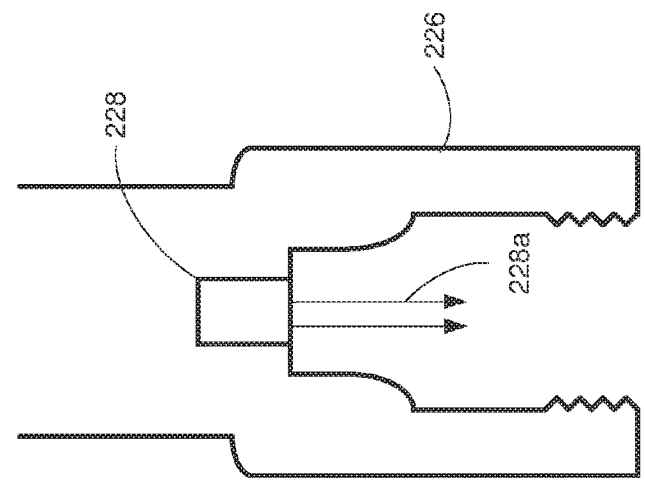
FIG. 9D is a schematic cross-sectional side view of an overshot type fishing tool containing a phased array ultrasound imaging device.
Figure 9C:
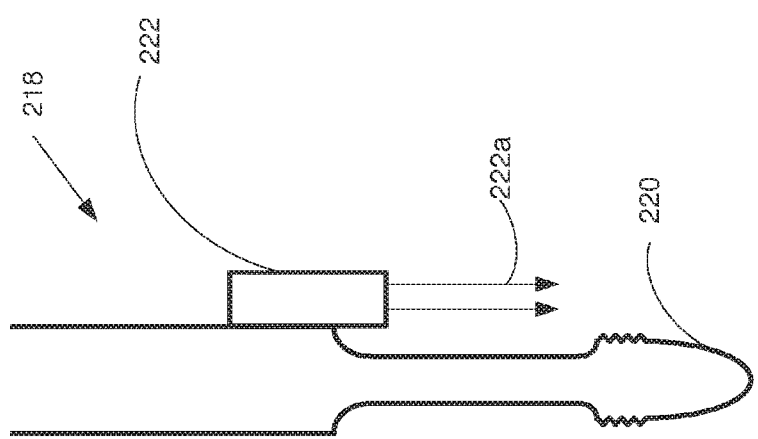
FIG. 9C is a schematic side view of a fishing spear tool containing a phased array ultrasound imaging device.

FIG. 9C illustrates a spear-type fishing tool 218 that is generally used to recover large tubular fish by inserting a spear tip 220 into the inside of the fish and attaching to the fish using a set of extendible slips (not shown). A phased array ultrasound imaging device 222 having a forward facing transducer is integrated into the tool to provide imaging data on the fish and help align the spear with the fish. In this example, the imaging device obtains imaging data from the area in front of the transducer array shown by arrows 222a.

FIG. 9D illustrates an overshot type fishing tool 224 comprising a large diameter, open mouth pipe 226 that surrounds the outside of the fish to grab the fish. A phased array ultrasound imaging device 228 having a forward facing transducer array is integrated into the tool to obtain imaging data on the fish and to align the fish with the mouth of the pipe. In this example, the imaging device obtains imaging data from the area in front of the transducer array shown by arrows 228a.

The phased array ultrasound imaging device may also be integrated with a casing swage tool, an example of which is shown in FIG. 9E. The casing swage tool 230 generally has a tapered nose 232 used to open collapsed casing and/or make a swage run prior to running a production tool to ensure the inner diameter of the casing is clear. The casing swage includes an integrated phased array imaging device 234 having a radial-shaped or ring transducer for imaging the inner diameter of the wellbore and/or the casing in the radial area surrounding the ring transducer shown by arrows 234a.

While the fishing tools shown in FIGS. 9A, 9B and 9D illustrate the phased array ultrasound imaging device located in the centre of the tool, the imaging device may also be offset to one side of the tool, i.e. off centre. Having the imaging device off centre allows for imaging data to be gathered from multiple angles when the tool is rotated in the well. This imaging data can then be merged to create a higher quality image of the fish or the area being imaged, since there is less likelihood of missing data due to occlusions, and more precise measurements available due to decreased ultrasonic artifacts.

During recovery operations, the phased array ultrasound imaging device provides high resolution real time images of any obstructions in the well and the surrounding area, thereby providing detailed information on the obstruction, which increases the efficiency and effectiveness of recovery operations. Integrating the imaging device into a recovery tool allows information to be gathered on the obstruction and the obstruction to be recovered or opened up on a single trip into the well, thus reducing the time and costs associated with recovery operations. Obtaining real-time high resolution imaging data during fishing operations also enables better placement of a fishing tool on the fish, since the fishing tool can be rotated and moved axially based on the imaging data being obtained in real-time to line up the fishing tool with the fish, allowing for quicker and more effective recovery operations.

Imaging Wells During Milling Operations

In some embodiments of the invention, the phased array ultrasound imaging device described above is integrated with milling equipment to obtain real time images from within the wellbore before, during and after milling processes. FIGS. 10A and 10B illustrate embodiments of the invention wherein two phased array ultrasonic imaging devices are integrated onto a milling tool.

FIG. 10A illustrates a taper mill 240 having helical teeth 240a wrapped around the body 240b of the mill, and a first and second phased array ultrasonic imaging device 244, 242 located at either end of the mill. The first imaging device 244 at the downhole end 240c of the mill preferably has a forward facing linear transducer array for imaging a volume downhole of the tool, shown by arrows 244a. The second imaging device 242 at the uphole end 240d of the tool preferably has a radial or ring-shaped transducer array that allows for imaging of the volume located radially around the tool, shown by arrows 242a.

FIG. 10B illustrates a junk mill 250 having a blade 252 with two integrated phased array ultrasound imaging devices 254, 256. The imaging device 254 at the downhole end of the junk mill near the blade preferably has a forward facing linear transducer array for imaging a volume in front of the blade shown by arrows 254a. The second imaging device 256 preferably has a radial or ring-shaped transducer array for imaging a volume located radially around the tool, shown by arrows 256a.

While each of the milling tools shown in FIGS. 10A and 10B have two phased array ultrasound imaging devices, one being a forward facing linear transducer array and one being a radial transducer array integrated on the tool, it is to be understood that the tool may include other numbers of phased array ultrasound imaging devices, for example only one imaging device, or three or more imaging devices. The transducer arrays may also be configured in other shapes, such as linear arrays facing in other directions such as uphole or out to the side of the tool, or curved arrays that do not extend around the full circumference of the tool.

Imaging of the wellbore with the one or more imaging devices on the milling tool allows imaging to occur before, during or after milling operations without removing the milling tool from the wellbore and without having to deploy a separate tool for gathering image data. This allows for high-quality, real-time images to be obtained in a cost-effective and efficient manner. For example, as the milling tool is deployed into the wellbore, the imaging device(s) can be used to obtain a three-dimensional image of the length of the wellbore, providing valuable information on the condition of the casing or liner and any debris or items located in the well. When the milling tool reaches an obstruction or debris in the well which is to be cleared, the forward facing transducer can provide a high-resolution image of the obstruction or debris, providing information on the type and position of the obstruction or debris which is valuable in making steps regarding the milling operation, for example the speed at which milling is to occur. The forward facing transducer can continue to provide real-time imaging information while milling is occurring to aid the operators in the milling process. Imaging information can also be gathered after milling is complete to confirm that the operation has been successful and to ascertain whether any debris or damage exists in the wellbore.

In another example, the milling tool with one or more integrated phased array ultrasound imaging devices can provide imaging data before, during and after sidetracking operations. This allows for the imaging device to determine the shape, location and orientation of any windows that have been milled in the casing or completion, and any lips or features around the windows that may affect subsequent drilling operations.

By integrating the imaging device with the milling tool, the need for additional trips into the wellbore for information gathering purposes is eliminated, saving time and reducing costs. Additionally, if the milling operation has been suboptimal, either by not fully removing the debris or by a poorly milled window, the milling can continue without having to redeploy the milling tool after it has been removed for imaging purposes.

Imaging During Drilling Operations

Figure 11:
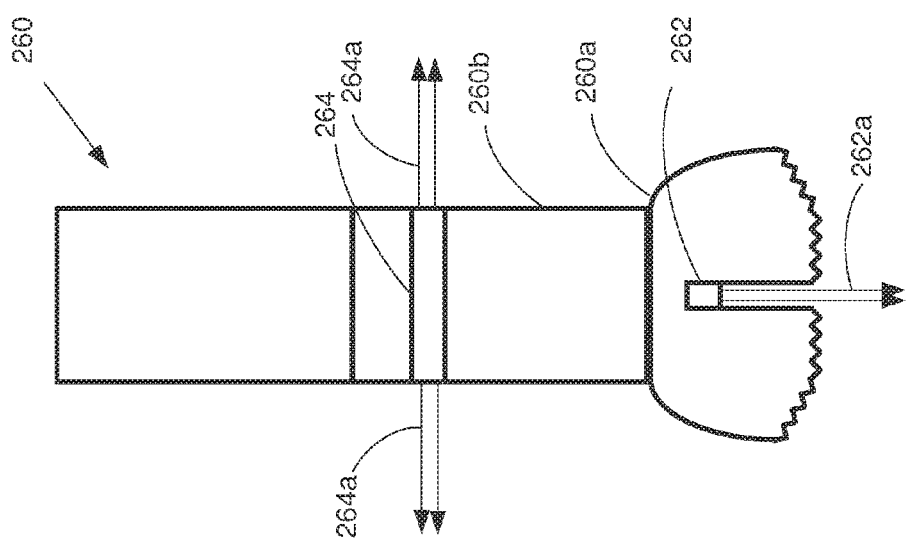
FIG. 11 is a schematic cross-sectional side view of a bottom hole assembly (BHA) containing two phased array ultrasound imaging device.

In certain embodiments of the invention, one or more phased array ultrasound imaging devices, as previously described, are integrated into a drill string to obtain imaging data during drilling operations. The imaging device(s) may have forward facing transducers and/or radial transducers that are integrated with the bottom hole assembly (BHA) of the drill string. FIG. 11 illustrates one embodiment of a BHA 260 having a drill bit 260a and integrated phased array ultrasound imaging devices. A first imaging device 262 may be located in the drill bit and include a forward facing transducer array for imaging the area downhole of the drill bit as shown by arrows 262a. A second imaging device 264 may be located around the body 260b of the BHA and include a radial transducer array for imaging the radial area around the BHA body, shown by arrows 264a.

By integrating one or more imaging devices on a drill string, imaging data can be obtained on the rock that the drill string is drilling through. This information is useful in steering the drill and managing its speed and rotation. The data is also of use in well and completion planning.

When a drill string is removed from a well, imaging data can also be obtained on the formation through which a borehole has just been drilled, such as for example using the radial shaped transducer array on the imaging device 264 in FIG. 11. Such information is valuable in planning the remainder of the well and subsequent wells in the same area, and can provide information on washouts and drill cutting buildup, as shown in FIGS. 12 and 13.

Figure 12:
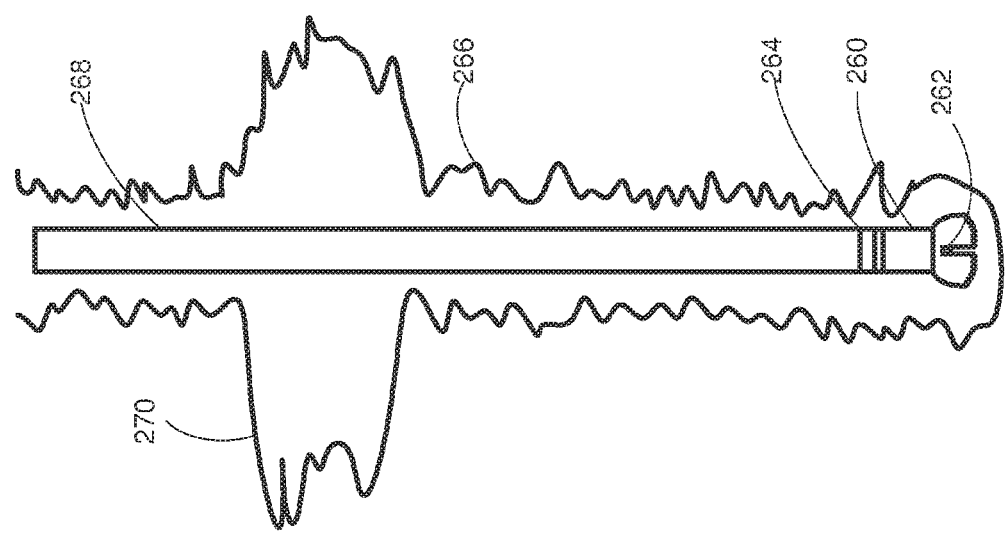
FIG. 12 is a schematic cross-sectional side view of a drill string comprising the BHA of FIG. 11, the drill string being in a borehole having a washout area.
Figure 13:
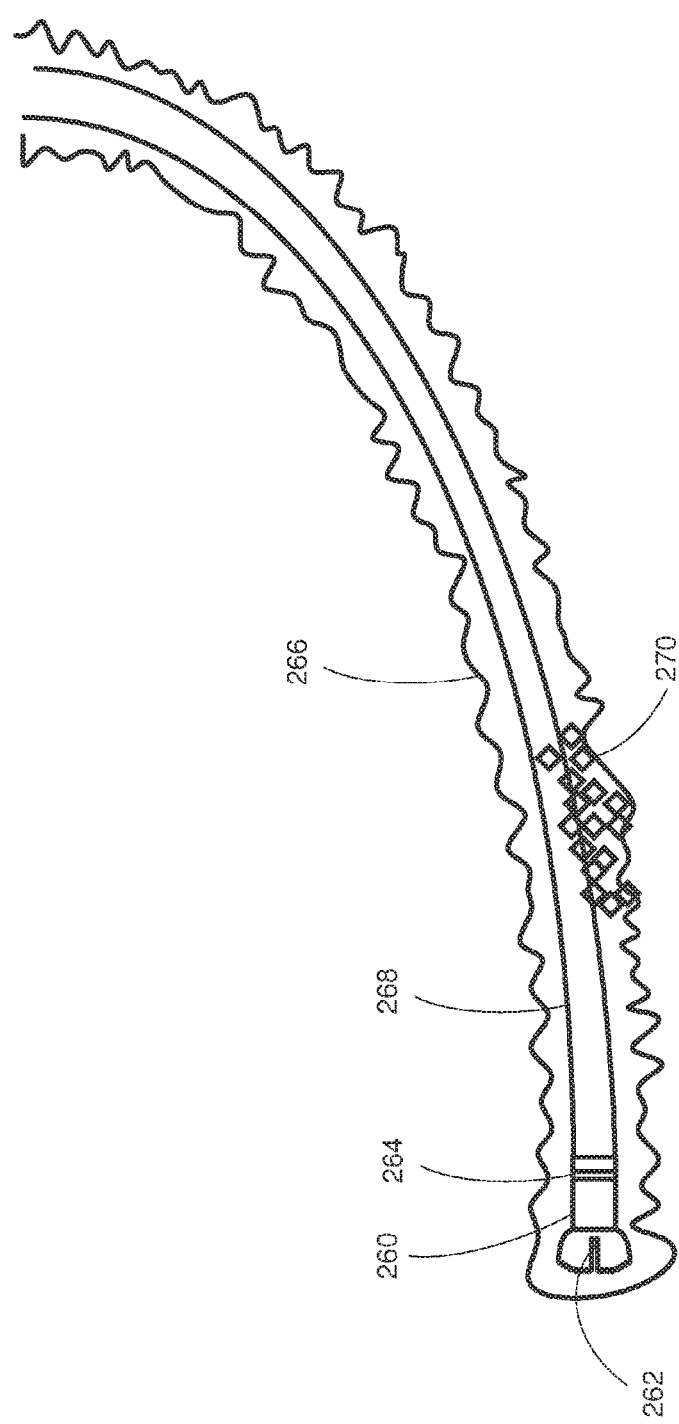
FIG. 13 is a schematic cross-sectional side view of a drill string comprising the BHA of FIG. 11, the drill string being in a borehole having a drill cuttings build up area.

FIGS. 12 and 13 illustrate a borehole 266 recently drilled by a drill string 268 having BHA 260 with a radial transducer array imaging device 264 and a forward facing transducer array imaging device 262. In FIG. 12, part of the borehole has been washed away creating a washout 270 with a larger diameter than the rest of the borehole. As the drill string is removed from the borehole, the radial transducer array imaging device 264 obtains imaging data on the entire length of the borehole, thereby providing data on the washout, including the existence of it, the location, size, and surrounding formation and fluids. This data is particularly valuable for planning cementing operations.

In FIG. 13, drill cuttings 270 have built up in an area in the borehole. As the drill string is removed from the borehole, the radial transducer array imaging device 264 obtain imaging data on the entire length of the borehole, thereby providing data on the drill cuttings build up. Cuttings buildup can cause the drillstring and other tools to get stuck, therefore it can be valuable to obtain information on the location and size of the buildup, and the surrounding formation.

Although the present invention has been described and illustrated with respect to preferred embodiments and preferred uses thereof, it is not to be so limited since modifications and changes can be made therein which are within the full, intended scope of the invention as understood by those skilled in the art.

The invention claimed is:

1. A method for imaging an in-situ heavy oil well production liner string comprising the steps of:
   a) inserting a phased array ultrasound imaging system into the well before the well is placed on production, the imaging system including a ranging system operatively connected to the imaging system;
   b) moving the imaging system through the liner string in a substantially horizontal section of the well while activating the imaging system to generate a three dimensional image of the liner string; and
   c) assessing the condition liner string using the three-dimensional image of the liner string;
   wherein steps a) and b) occur during one or both of ranging operations using the ranging system within the well as a second well is being drilled adjacent to the well, and after the ranging operations have been completed and the imaging system and ranging system are being removed from the well, the ranging operations including using the ranging system to aid in locating a drill in the second well.

2. The method as in claim 1, wherein the phased array ultrasound imaging system has a ring-shaped or radial transducer.

3. The method as in claim 1 wherein steps a) and b) are undertaken during a well completions process.

4. The method as in claim 1, wherein the well contains water, brine, water-based drilling mud, oil-based drilling mud or production fluids.

5. A device for imaging an in-situ heavy oil well production liner string during completions operations comprising:
   a body adapted for movement through the liner string;
   a downhole tractor operatively connected to the body for providing motive power to move the device through the liner string;
   a phased array ultrasound imaging system operatively connected to the body for generating a three-dimensional image of the liner string that can be used to assess the condition of the liner string; and
   a ranging system operatively connected to the body for guiding a drill in a second well as the second well is being drilled.

6. The device as in claim 5, wherein the phased array ultrasound imaging system has a ring-shaped or radial transducer.

7. The device as in claim 5, wherein the ranging system includes a ranging magnet.

* * * * *